United States Patent Office 3,574,223
Patented Apr. 6, 1971

3,574,223
5-SUBSTITUTED-O,O-DIALKYL-S - [(1,2,4-THIADI-AZOL - 3 - YL)METHYL] PHOSPHOROTHIOATES AND -DITHIOATES
Rudi F. W. Rätz, deceased, late of Hamden, Conn., by Margot I. H. Rätz, executrix, Hamden, and John F. Cronan, Waterbury, Conn., assignors to The Ansul Company
No Drawing. Filed Mar. 15, 1968, Ser. No. 713,545
Int. Cl. C07e 9/16
U.S. Cl. 260—302                                    17 Claims

ABSTRACT OF THE DISCLOSURE

Compounds having the formula

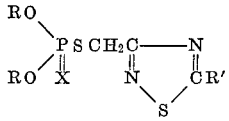

wherein R is alkyl; X is oxygen or sulfur; and R' is OR, SR, $NH_2$, NHR or $NR_2$ wherein R is alkyl are provided by reacting 5-substituted 3-chloromethyl-1,2,4-thiadiazoles with alkali metal or ammonium salts of dialkyl phosphorothioates and -dithioates. These compounds are useful agricultural chemicals; for example, they are particularly valuable insecticides.

This invention relates to a series of 5-substituted O,O-dialkyl - S - [(1,2,4 - thiadiazol - 3 - yl)methyl] phosphorothioates and -dithioates having the following formula

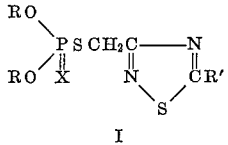

I wherein R is alkyl; X is oxygen or sulfur; and R' is OR, SR, $NH_2$, NHR or $NR_2$ wherein R is alkyl.

The compounds I of this invention are provided by reacting a 5 - substituted 3 - chloromethyl - 1,2,4 - thiadiazole with alkali metal or ammonium salts of dialkyl phosphorothioates and -dithioates in accordance with the following equation wherein M is alkali metal or ammonium and R, R' and X are as previously described.

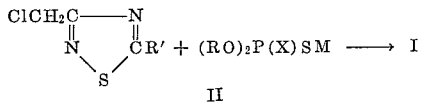

II

The 5-substituted 3-chloromethyl - 1,2,4 - thiadiazoles II employed in the preparation of the compounds of this invention are readily provided by the reaction of 3-chloromethyl-5-chloro-1,2,4-thiadiazole with an appropriate alcohol, thiol or amine in accordance with the following equation wherein R' is as previously described.

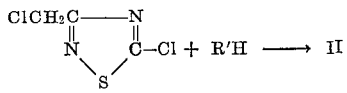

While any 5 - substituted 3 - chloromethyl - 1,2,4-thiadiazole II and alkali metal or ammonium salt of dialkyl phosphorothioate or -dithioate can be employed in the preparation of compounds I, preferred embodiments employ those starting reactants wherein R is lower alkyl, i.e., alkyl having 1–5 carbon atoms.

Exemplificative preferred 5-substituted 3-chloromethyl-1,2,4-thiadiazoles II include 3 - chloromethyl - 5 - methoxy - 1,2,4 - thiadiazole; 3 - chloromethyl - 5 - n - butoxy - 1,2,4 - thiadiazole; 3 - chloromethyl - 5 - ethoxy-1,2,4 - thiadiazole; 3 - chloromethyl - 5 - ethylthio-1,2,4 - thiadiazole; 3 - chloromethyl - 5 - methylthio-1,2,4 - thiadiazole; 3 - chloromethyl - 5 - dimethylamino-1,2,4 - thiadiazole and 3 - chloromethyl - 5 - methylethylamino-1,2,4-thiadiazole.

Illustrative preferred alkali metal or ammonium salts of dialkyl phosphorothioates and -dithioates include ammonium O,O-dimethyl phosphorodithioate; ammonium O,O-diethyl phosphorodithioate; ammonium O,O-diethyl phosphorothioate; potassium O,O-diisopropyl phosphorodithioate and potassium O,O-di-nbutyl phosphorodithioate.

The 5 - substituted - O,O, - dialkyl - S - [(1,2,4 - thiadoazol - 3 - yl)methyl] phosphorothioates and -dithioates I are readily prepared by reacting a 5-substituted 3-chloromethyl-1,2,4-thiadiazole II with an alkali metal or ammonium salt of a dialkyl phosphorothioate or -dithioate, preferably in the presence of an anhydrous solvent, at any temperature up to the boiling point of the particular solvent employed. Suitable solvents include acetonitrile; temperatures between about 50° and about 80° C. are preferred where this solvent is employed as the reaction medium.

The desired 5 - substituted - O,O - dialkyl - S - [(1,2,4-thiadiazol - 3 - yl)methyl] phosphorothioates and -dithioates I are obtained in high yield and excellent purity and are readily isolated from the reaction mixture by conventional techniques such as filtration, distillation and the like.

The compounds I of this invention have a wide variety of useful applications. They are particularly valuable agricultural chemicals. Thus, they exhibit strong pesticidal activity as insecticides, fungicides, herbicdes, etc. Generally, they are mixed with various adjuvants in these applications, and low concentrations of the compound are extremely effective.

For example, they are excellent contact insecticides for such insects as the fly and the Mexican bean beetle. Thus, O,O - dimethyl - S - [(5 - methoxy - 1,2,4 - thiadiazol-3 - yl)methyl] phosphorodithioate; O,O-diethyl - S - [(5-ethylthio - 1,2,4 - thiadiazol - 3 - yl)methyl] phosphorothioate; O,O - diethyl - S -[(5 - methylthio - 1,2,4 - thiadiazol - 3 - yl)methyl] phosphorodithioate; O,O - dimethyl - S - [(5 - diethylamino - 1,2,4 - thiadiazol - 3 - yl)methyl] phosphorodithioate; O,O - diethyl - S - [(5-ethoxy - 1,2,4 - thiadiazol - 3 - yl)methyl] phosphorothioate and O,O - diethyl - S - [(5 - dimethylamino-1,2,4-thiadiazol-3-yl)methyl] phosphorothioate were very effective in killing flies and Mexican bean beetles when applied in an insecticidal formulation containing .1 percent by weght of the insecticide.

The compounds I of this invention are also valuable soil fungicides against a wide variety of plant pathogenic fungi. For example, dusts containing 10 percent by weight of O,O - dimethyl - S - [(5 - ethoxy - 1,2,4 - thiadiazol-3 - yl)methyl] phosphorodithioate; O,O - diisopropyl-S-[(5 - ethoxy - 1,2,4 - thiadiazol - 3 - yl)methyl] phosphorodithioate and O,O - diethyl - S - [(5 - diethylamino-1,2,4 - thiadiazol - 3 - yl)methyl] phosphorodithioate respectively, were effective in inhibiting germination of Rhizoctonia solani spores, a soil-borne fungus harmful to cotton, vegetables, potatoes, turf, grass, etc.

The post-emergence herbicidal effectiveness of compounds I is illustrated by the control of crabgrass and pigweed by O,O - dimethyl - S - [(5 - ethoxy - 1,2,4-thiadiazol - 3 - yl)methyl] phosphorodithioate and O,O-dimethyl - S - [(5 - diethylamino - 1,2,4 - thiadiazol-3-yl)methyl] phosphorodithioate at a rate of application of 20 pounds per acre.

The following examples are presented to illustrate the preparation of various 5 - substituted - O,O - dialkyl- S - [(1,2,4 - thiadiazol - 3 - yl)methyl] phosphorothioates and -dithioates in accordance with the practice of this invention.

EXAMPLE 1

(A) Preparation of precursor

The amount of 25.0 g. (0.148 mole) of 3-chloromethyl-5-chloro-1,2,4-thiadiazole, prepared by condensation of monochloroacetamidine hydrochloride with trichloromethylsulfenyl chloride in the presence of base as described by H. Schroeder et al. in J. Org. Chem. 27, 2589, 1962, was dissolved in 100 ml. of methanol. To the mixture was added dropwise, with stirring, a solution of 3.4 g. (0.148 mole) of sodium metal in 150 ml. of methanol. After refluxing for two hours, the reaction mixture was left standing at room temperature for 12 hours. Filtration provided 7.5 g. of sodium chloride. The filtrate was stripped of solvent to provide 23.3 g. of crude yellow oil. Vacuum distillation at 73° C./3.0 mm. Hg provided 20.0 g. of colorless oil, $n_D^{20}$ 1.5355. The following analytical data confirmed that 3-chloromethyl-5-methoxy-1,2,4-thiadiazole had been obtained.

*Analysis.*—Calcd. for $C_4H_5ClN_2OS$ (percent): C, 29.18; H, 3.07; N, 17.02. Found (percent): C, 28.22; H, 2.81; N, 16.22.

(B) Synthesis of O,O-dimethyl-S-[(5-methoxy-1,2,4-thiadiazol-3-yl)methyl] phosphorodithioate The amount of 3.6 g. (0.022 mole) of 3-chloromethyl-5-methoxy-1,2,4-thiadiazole was dissolved in 20 ml. of dry acetonitrile and added directly to a solution of 4.0 g. (0.022 mole) of ammonium O,O-dimethylphosphorodithioate in 80 ml. of the same solvent. The mixture was heated for 12 hours at 55° C. oil bath temperature and then filtered; 1.0 g. of ammonium chloride was collected. The filtrate was stripped of solvent to give 6.0 g. of crude yellow oil which was then dissolved in 100 ml. of ether, washed with two 25 ml. portions of water and dried over sodium sulfate. Complete solvent removal provided 4.1 g. of yellowish oil, $n_D^{20}$ 1.5610. The following analytical data revealed that O,O-dimethyl-S-[(5-methoxy - 1,2,4 - thiadiazol-3-yl)methyl]phosphorodithioate had been obtained.

*Analysis.*—Calcd. for $C_6H_{11}N_2O_3PS_3$ (percent): C, 25.17; H, 3.88; S, 33.59. Found (percent): C, 24.88; H, 3.96; S, 33.26.

EXAMPLE 2

(A) Preparation of Precursor

The amount of 10.0 g. (0.059 mole) of 3-chloromethyl-5-chloro-1,2,4-thiadiazole was dissolved in 100 ml. of ethanol. To this was added dropwise, with stirring, 1.77 g. (0.059 mole) of metallic sodium in 40 ml. of ethanol. The reaction mixture was kept for two hours at 60° C. and then left standing at room temperature for 48 hours. Filtration provided 3.6 g. of sodium chloride. The ethanol filtrate was stripped of solvent leaving a yellow oil which was subjected to vacuum distillation. After cutting a very small forerun, the main fraction distilled at 56° C./0.6 mm. Hg. The following analytical data confirmed that 3-chloromethyl-5-ethoxy-1,2,4-thiadiazole had been obtained.

*Analysis.*—Calcd. for $C_5H_7ClN_2OS$ (percent): C, 33.62; H, 3.96; N, 15.01. Found (percent): C, 34.59; H, 4.18; N, 14.40.

(B) Synthesis of O,O-diethyl-S-[(5-ethoxy-1,2,4-thiadiazol-3-yl)methyl]phosphorodithioate The amount of 4.06 g. (0.02 mole) of ammonium O,O-diethyl phosphorodithioate was dissolved in 50 ml. of dry acetonitrile. To this solution was added a solution of 3.6 g. (0.02 mole) of 3-chloromethyl-5-ethoxy-1,2,4-thiadiazole in 20 ml. of the same solvent. The mixture was heated in an oil bath for 12 hours at 60° C. Upon cooling to room temperature, the amount of 0.81 g. of ammonium chloride was collected by filtration. After complete solvent removal 6.0 g. of crude oil was recovered from the filtrate. This oil was redissolved in ether, filtered, washed, dried and vacuum distilled to provide 4.0 g. of oily product, B.P. 163° C./1.2 mm. Hg; $n_D^{20}$ 1.5420. The following analytical data revealed that O,O-diethyl-S-[(5 - ethoxy - 1,2,4 - thiadiazol-3-yl) methyl]phosphorodithioate had been obtained.

*Analysis.*—Calcd. for $C_9H_{17}N_2O_3PS_3$ (percent): C, 32.91; H, 5.23; N, 8.53; P, 9.43; S, 29.28. Found (percent): C, 33.09; H, 5.27; N, 8.30; P, 9.06; S, 29.13.

EXAMPLE 3

Ammonium O,O-dimethylphosphorodithioate (3.5 g., 0.02 mole) was dissolved in 80 ml. of dry acetonitrile by gentle heating to 55° C. To this solution was added in one portion a solution of 3.570 g. (0.02 mole) of 3-chloromethyl-5-ethoxy-1,2,4-thiadiazole, prepared as described in Example 2, in 25 ml. of dry acetonitrile. Ammonium chloride separation started immediately. The reaction mixture was heated overnight at 60° C. with stirring and then filtered, thereby recovering 1.0 g. ammonium chloride. After evaporation of the filtrate a yellow residual oil (6.5 g.) was obtained. The oil was redissolved in ether, the solution filtered, and the filtrate washed twice with 25 ml. of water. After drying the ethereal layer over sodium sulfate, filtration and evaporation provided 5.5 grams of a yellow-golden clear oil; $n_D^{20}$ 1.5409. The ollowing analytical data revealed that O,O-dimehtyl-S-[(5-ethoxy-1,2, 4 - thiadiazol-3-yl)methyl]phosphorodithioate had been obtained.

*Analysis.*—Calcd. for $C_7H_{13}N_2O_3PS_3$ (percent): C, 28.00; H, 4.37; P, 10.02. Found (percent): C, 30.27; H, 4.94; P, 8.60.

EXAMPLE 4

A solution of 5.04 g. (0.02 mole) of potassium O,O-diisopropylphosphorodithioate in 100 ml. of dry acetonitrile was mixed with a solution of 3.57 g. (0.02 mole) of 3-chloromethyl-5-ethoxy-1,2,4-thiadiazole in 20 ml. of the same solvent. Refluxing of this solution for four hours with stirring followed by filtration afforded 1.25 g. potassium chloride. The solvent was removed from the filtrate by rotary evaporation and the residual oil was redissolved in 100 ml. of ether. After filtration, the ethereal solution was washed twice with 30 ml. portions of water, dried over sodium sulfate and filtered. The solvent was removed from the filtrate by rotary evaporation and the liquid obtained was kept at 80° C./14 mm. Hg for 40 minutes to provide 5.96 g. of golden-yellow clear oil. The following analytical data revealed that O,O-diisopropyl - S - [(5-ethoxy-1,2,4-thiadiazol-3-yl)methyl] phosphorodithioate had been obtained.

*Analysis.*—Calcd. for $C_{11}H_{21}N_2O_3PS$ (percent): C, 37.1; H, 5,91; P, 8.72. Found (percent): C, 38.20; 38.28; H, 6.14; 6.33; P, 7.76; 7.74.

EXAMPLE 5

(A) Preparation of precursor

A solution of 0.23 g. of metallic sodium in 35 ml. of absolute ethanol was mixed with a solution of 1.5 g. ethanethiol in 25 ml. of the same solvent. This mixture was added dropwise, with stirring, to a solution of 1.69 g. of 3-chloromethyl-5-chloro-1,2,4-thiadiazole in 30 ml. of absolute ethanol. After addition was complete the reaction mixture was refluxed for three hours. The sodium chloride formed was then separated by filtration. After ethanol removal from the filtrate, an oily residue was obtained. This oil was dissolved in 30 ml. of ether and then filtered. The filtrate was stripped of solvent to provide a crude oil. Vacuum distillation at 90° C./1.4 mm. Hg yielded 1.9 g. of oily product; $n_D^{25}$ 1.5800. The following analytical data revealed that 3-chloromethyl-5-ethylthio-1,2,4-thiadiazole had been obtained.

*Analysis.*—Calcd. for $C_5H_7ClN_2S_2$ (percent): S, 32.9. Found (percent): S, 33.50.

(B) Synthesis of O,O-diethyl-S-[(5-ethylthio-1,2,4-thiadiazol-3-yl)methyl] phosphorothioate The amount of 1.0 g. (0.005 mole) of 3-chloromethyl-5-methylthio-1,2,4-thiadiazole was dissolved in 30 ml. of dry acetonitrile. To this was added directly 1.0 g. (0.005 mole) of ammonium O,O-diethylphosphorothioate dissolved in 100 ml. of the same solvent. After heating for three hours in an oil bath at 65° C. and then cooling to room temperature, the reaction mixture was filtered, thereby collecting 0.25 g. of ammonium chloride. The filtrate was stripped of solvent to give 1.7 g. of oil. This oil was redissolved in ether, washed with two 35 ml. portions of water and dried over sodium sulfate. After complete solvent removal, 1.5 g. of clear oil was obtained. Infrared analysis and the following analytical data revealed that O,O-diethyl-S-[(5 - ethylthio-1,2,4-thiadiazol-3-yl)methyl] phosphorothioate had been obtained.

*Analysis.*—Calcd. for $C_9H_{17}N_2O_3PS_3$ (percent): P, 9.43. Found (percent): P, 7.63.

EXAMPLE 6

(A) Preparation of precursor

The amount of 3.38 g. (0.02 mole) of 3-chloromethyl-5-chloro-1,2,4-thiadiazole was dissolved in 35 ml. of absolute methanol. To this was added dropwise, with stirring, a solution of 0.46 g. metallic sodium and 2.0 g. methanethiol in 60 ml. of absolute methanol. After completion of the addition, the mixture was refluxed for three hours, filtered and the filtrate evaporated to yield an oily residue. Rotary evaporation provided 3.5 g. of a clear yellow-orange oil B.P. 90° C./.02 mm. Hg; $n_D^{25}$ 1.6058. The following analytical data confirmed that 3-chloromethyl-5-methylthio-1,2,4-thiadiazole had been obtained.

*Analysis.*—Calcd. for $C_4H_5ClN_2S_2$ (percent): S, 35.50. Found (percent): S, 36.15.

(B) Synthesis of O,O-diethyl-S-[(5-methylthio-1,2,4-thiadiazol-3-yl)methyl]phosphorodithioate The amount of 2.1 g. (0.0116 mole) of 3-chloromethyl-5-methylthio-1,2,4-thiadiazole was dissolved in 30 ml. of dry acetonitrile. To this was added directly 2.35 g. of ammonium O,O-diethylphosphorodithioate dissolved in 100 ml. of the the same solvent. The mixture was heated for three hours in an oil bath of 80° C., cooled to room temperature and filtered to collect 0.6 g. of ammonium chloride. The filtrate was stripped of solvent to give 3.4 g. of oil which was redissolved in ether, washed with two 35 ml. portions of water and dried over sodium sulfate. After complete solvent removal, 2.6 g. of clear oil was collected. The following analytical data revealed that O,O-diethyl - S - [(5-methylthio-1,2,4-thiadiazol-3-yl)methyl] phosphorodithioate had been obtained.

*Analysis.*—Calcd. for $C_8H_{15}N_2O_2PS_4$ (percent): C, 28.07; H, 4.58; P, 9.37. Found (percent): C, 29.28; H, 4.52; P, 8.75.

EXAMPLE 7

(A) Preparation of precursor

The amount of 5.0 g. (0.0296 mole) of 3-chloromethyl-5-chloro-1,2,4-thiadiazole was dissolved in 50 ml. of benzene. To this was added directly 4.5 g. of diethylamine dissolved in 20 ml. of benzene. This mixture was left standing for 12 hours at room temperature and then filtered to collect 3.1 g. of diethylamine hydrochloride. The filtrate was stripped of solvent to give 6.0 g. of yellow oil, which was dissolved in ether, washed with two 25 ml. portions of water and dried over sodium sulfate. Upon complete solvent removal 3.8 g. of crude oily product was recovered. This oil was subjected to vacuum distillation to give 2.8 g. of clear oil; $n_D^{20}$ 1.5430. The following analytical data revealed that 3-chloromethyl-5-diethylamino-1,2,4-thiadiazole had been obtained.

*Analysis.*—Calcd. for $C_7H_{12}ClN_3S$ (percent): C, 40.87; H, 5.89; N, 20.43. Found (percent): C, 40.68; H, 5.91; N, 20.61.

(B) Synthesis of O,O-dimethyl-S-[(5-diethylamino-1,2,4-thiadiazol-3-yl)methyl]phosphorodithioate The amount of 2.0 g. (0.0097 mole) of 3-chloromethyl-5-diethylamino-1,2,4-thiadiazole was dissolved in 20 ml. of dry acetonitrile. To this was added directly 1.7 g. of ammonium O,O-dimethylphosphorodithioate dissolved in 100 ml. of the same solvent. The mixture was heated for three hours to 65° C. (oil bath temperature). After cooling to room temperature, the mixture was filtered to provide 0.5 g. of ammonium chloride. The filtrate was stripped of solvent to give a yellow oil which was redissolved in 125 ml. of ether, washed with two portions of 35 ml. of water, and the solution dried over sodium sulfate. After complete solvent removal, 2.4 g. of clear yellow oil, $n_D^{25}$ 1.5525 was recovered. The following analytical data revealed that O,O-dimethyl-S-[(5-diethylamino-1,2,4 - thiadiazol-3-yl)methyl]phosphorodithioate had been obtained.

*Analysis.*—Calcd. for $C_9H_{18}N_3O_2PS$ (percent): C, 32.95; H, 5.55. Found (percent): C, 32.13; H, 5.65.

EXAMPLE 8

The amount of 2.0 g. (0.0097 mole) of 3-chloromethyl-5-diethylamino-1,2,4-thiadiazole was dissolved in 20 ml. of dry acetonitrile. To this was added directly 2.0 g. (0.0097 mole) of ammonium O,O-diethylphosphorodithioate dissolved in 90 ml. of the same solvent. The mixture was heated for 3 hours in an oil bath at 65° C. After cooling to room temperature, the mixture was filtered to collect 0.49 g. of ammonium chloride. The filtrate was stripped of solvent to give 3.4 g. of oil which was redissolved in ether, washed with two 35 ml. portions of water and dried over sodium sulfate. After complete solvent removal, 3.3 g. of clear yellow oil was recovered; $n_D^{25}$ 1.5565. The following analytical data revealed that O,O-diethyl-S-[(5-diethylamino-1,2,4-thiadiazol - 3 - yl)methyl]phosphorodithioate had been obtained.

*Analysis.*—Calcd. for $C_{11}H_{22}N_3O_2PS$ (percent): C, 37.16; H, 6.25. Found (percent): C, 37.15; H, 6.29.

EXAMPLE 9

(A) Preparation of precursor

The amount of 20.0 g. (0.118 mole) of 3-chloromethyl-5-chloro-1,2,4-thiadiazole was dissolved in 50 ml. of benzene. This solution was added directly to 10.6 g. (0.236 mole) of dimethylamine dissolved in the same solvent. The mixture was refluxed for 3 hours and the formed dimethylamine hydrochloride removed by filtration. The benzenic filtrate was washed with 80 ml. of water, dried over sodium sulfate and stripped of solvent to give 20.0 g. of crude oil. Vacuum distillation provided 16.8 g. of clear yellow oil, B.P. 136° C./1.8 mm. Hg. The following analytical data confirmed that 3-chloromethyl-5-dimethylamino-1,2,4-thiadiazole had been obtained.

*Analysis.*—Calcd. for $C_5H_8ClN_3S$ (percent): C, 33.80; H, 4.54; N, 23.65. Found (percent): C, 34.01; H, 4.70; N, 23.30.

(B) Synthesis of O,O-dimethyl-S-[(5-dimethylamino-1,2,4-thiadiazol-3-yl)methyl]phosphorodithioate The amount of 3.0 g. (0.018 mole) of 3-chloromethyl-5-dimethylamino-1,2,4-thiadiazole was dissolved in 30 ml. of dry acetonitrile. To this was added directly a solution of 2.5 g. (0.018 mole) of ammonium O,O-dimethylphosphorodithioate in 180 ml. of the same solvent. The mixture was heated for four hours at 60° C. oil bath temperature and then filtered to separate 1.0 g. of ammonium chloride. The filtrate was stripped of solvent to give 5.3 g. of crude yellow oil which was dissolved in 100 ml. of ether, washed with two 40 ml. portions of water, and dried over sodium sulfate. Upon complete solvent removal 5.0 g. of oil was obtained; $n_D^{20}$ 1.5765. The following analytical data revealed that O,O-dimethyl-S-[(5-dimethylamino-1,2,4-thiadiazol-3-yl)methyl]phosphorodithioate had been obtained.

Analysis.—Calcd. for $C_7H_{14}N_3O_2PS_3$ (percent): C, 28.08; H, 4.71. Found (percent): C, 28.29; H, 4.76.

EXAMPLE 10

The amount of 2.5 g. (0.0141 mole) of 3-chloromethyl-5-dimethylamino-1,2,4-thiadiazole was dissolved in 30 ml. of dry acetonitrile. To this was added directly a solution of 2.9 g. (0.0141 mole) of ammonium O,O-diethylphosphorodithioate in 130 ml. of the same solvent. The mixture was heated for hour hours at 70° C. oil bath temperature and filtered to remove 0.65 g. of ammonium chloride. The filtrate was stripped of solvent to give 4.3 g. of crude yellow oil which was subjected to vacuum distillation to provide 3.0 g. of clear yellowish oil; B.P. 184° C./0.25 mm. Hg. The following analytical data revealed that O,O-diethyl-S-[(5-dimethylamino-1,2,4-thiadiazol-3-yl)methyl]phosphorodithioate had been obtained.

Analysis.—Calcd. for $C_9H_{18}N_3O_2PS_3$ (percent): C, 33.01; H, 5.54; P, 9.46. Found (percent): C, 33.02; H, 5.49; P, 9.24.

EXAMPLE 11

The amount of 2.5 g. (0.015 mole) of 3-chloromethyl-5-dimethylamino-1,2,4-thiadiazole was dissolved in 30 ml. of dry acetonitrile. To this was added directly a solution of 3.8 g. (0.015 mole) of potassium O,O-diisopropyl phosphorodithioate in 150 ml. of the same solvent. The mixture was heated for 5 hours at 70° C. oil bath temperature and filtered to remove 1.0 g. of potassium chloride. The filtrate was stripped of solvent to give 5.1 g. of crude yellow oil which was dissolved in 100 ml. of ether and washed with two 40 ml. portions of water and dried over sodium sulfate. Upon complete solvent removal, 3.5 g. of yellowish oil was obtained; $n_D^{23}$ 1.5460. The following analytical data revealed that O,O-diisopropyl-S-[(5-dimethylamino-1,2,4-thiadiazol-3-yl)methyl]phosphorodithioate had been obtained.

Analysis.—Calcd. for $C_{11}H_{22}N_3O_2PS_3$ (percent): C, 37.17; H, 6.24; P, 8.71. Found (percent): C, 37.25; H, 6.23; P, 8.61, 8.60.

EXAMPLE 12

The amount of 5.0 g. (0.028 mole) of 3-chloromethyl-5-ethoxy-1,2,4-thiadiazole was dissolved in 30 ml. of dry acetonitrile. To this was added directly a solution of 5.2 g. (0.028 mole) of ammonium O,O-diethyl phosphorothioate in 180 ml. of the same solvent. The mixture was heated for three hours at 65° C. oil bath temperature and filtered to separate 1.5 g. of ammonium chloride. The filtrate was stripped of solvent to give 8.4 g. of crude oil which was dissolved in 100 ml. ether, washed with three 25 ml. portions of water and dried over sodium sulfate. Upon complete solvent removal 5.3 g. of product was obtained. One gram of this oil was subjected to vacuum distillation to give 0.5 g. of clear yellow oil; B.P. 187° C./1.0 mm. Hg; $n_D^{25}$ 1.5050. The following analytical data revealed that O,O-diethyl-S-[(5-ethoxy-1,2,4-thiadiazol-3-yl)methyl] phosphorothioate had been obtained.

Analysis.—Calcd. for $C_9H_{17}N_2O_4PS_2$ (percent): C, 34.61; H, 5.49; S, 20.53. Found (percent): C, 34.82; H, 5.64; S, 20.50.

EXAMPLE 13

The amount of 2.5 g. (0.0141 mole) of 3-chloromethyl-5-dimethylamino-1,2,4-thiadiazole was dissolved in 30 ml. of dry acetonitrile. To this was added directly a solution of 2.6 g. of ammonium O,O-diethylphosphorothioate in 120 ml. of the same solvent. The mixture was heated for four hours at 80° C. oil bath and filtered to separate 0.65 g. of ammonium chloride. The filtrate was stripped of solvent to give 4.4 g. of crude oil which was dissolved in 100 ml. of ether, washed with two 20 ml. portions of water and dried over sodium sulfate. After complete solvent removal, 3.8 g. of oil was recovered. This oil was subjected to vacuum distillation to give 1.3 g. of clear yellow oil; B.P. 185° C./0.35 mm. Hg. The following analytical data revealed that O,O-diethyl-S-[(5-dimethylamino-1,2,4-thiadiazol-3-yl)methyl] phosphorothioate had been obtained.

Analysis.—Calcd. for $C_9H_{18}N_3O_3PS_2$ (percent): C, 34.71; H, 5.83. Found (percent): C, 33.91; H, 5.73.

What is claimed is:

1. A compound having the formula

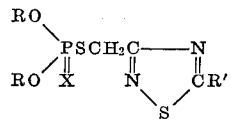

wherein each R is an independently selected lower alkyl; X is oxygen or sulfur; and R' is OR, SR, $NH_2$, NHR or $NR_2$ wherein R is lower alkyl.

2. The compound of claim 1 having the formula

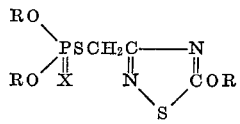

wherein each R is an independently selected lower alkyl and X is oxygen or sulfur.

3. The compound of claim 2 having the name O,O-dimethyl - S - [(5-methoxy-1,2,4-thiadiazol-3-yl)methyl] phosphorodithioate.

4. The compound of claim 2 having the name O,O-diethyl - S - [(5-ethoxy-1,2,4-thiadiazol-3-yl)methyl] phosphorodithioate.

5. The compound of claim 2 having the name O,O-dimethyl - S - [(5 - ethoxy-1,2,4-thiadiazol-3-yl)methyl] phosphorodithioate.

6. The compound of claim 2 having the name O,O-diisopropyl - S - [(5-ethoxy-1,2,4-thiadiazol-3-yl)methyl] phosphorodithioate.

7. The compound of claim 2 having the name O,O-diethyl - S - [(5-ethoxy-1,2,4-thiadiazol-3-yl)methyl] phosphorothioate.

8. The compound of claim 1 having the formula

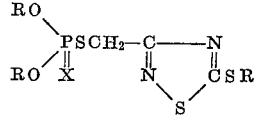

wherein each R is an independently selected lower alkyl and X is oxygen or sulfur.

9. The compound of claim 8 having the name O,O-diethyl - S - [(5 - ethylthio-1,2,4-thiadiazol-3-yl)methyl] phosphorothioate.

10. The compound of claim 8 having the name O,O-diethyl - S - [(5-methylthio-1,2,4-thiadiazol-3-yl)methyl] phosphorodithioate.

11. The compound of claim 1 having the formula

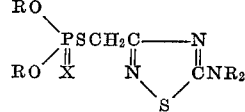

wherein each R is an independently selected lower alkyl and X is oxygen or sulfur.

12. The compound of claim 11 having the name O,O-dimethyl - S - [(5 - diethylamino-1,2,4-thiadiazol-3-yl) methyl] phosphorodithioate.

13. The compound of claim 11 having the name O,O-diethyl - S - [(5-diethylamino-1,2,4-thiadiazol-3-yl)methyl] phosphorodithioate.

14. The compound of claim 11 having the name O,O-dimethyl - S - [(5-dimethylamino-1,2,4-thiadiazol-3-yl)methyl] phosphorodithioate.

15. The compound of claim 11 having the name O,O-diethyl - S - [(5 - dimethylamino1,2,4-thiadiazol-3-yl)methyl] phosphorodithioate.

16. The compound of claim 11 having the name O,O-diisopropyl - S - [(5-dimethylamino-1,2,4-thiadiazol-3-yl)methyl] phosphorodithioate.

17. The compound of claim 11 having the name O,O-diethyl - S - [(5 - dimethylamino-1,2,4-thiadiazol-3-yl)methyl] phosphorothioate.

References Cited

UNITED STATES PATENTS

| 3,072,669 | 1/1963 | McConnell et al. | 260—302 |
| 3,299,061 | 1/1967 | Schroeder | 260—302 |

FOREIGN PATENTS

| 932,388 | 7/1963 | Great Britain | 260—302 |

ALTON D. ROLLINS, Primary Examiner

U.S. Cl. X.R.

71—87; 260—306.8; 424—200

PO-1050
(5/69)

UNITED STATES PATENT OFFICE
CERTIFICATE OF CORRECTION

Patent No. 3,574,223      Dated April 6, 1971

Inventor(s) Rudi F. W. Ratz and John F. Cronan

It is certified that error appears in the above-identified patent and that said Letters Patent are hereby corrected as shown below:

Column 2, line 14, change "doazol" to --diazol--.

Column 3, line 44, change "C, 24.88" to --C, 24.99--.

Column 4, line 27, change "ollowing" to --following-- line 54, change "H, 5,91" to --H, 5.91--.

Column 7, line 14, change "for hour hours" to --for four hours--.

Signed and sealed this 27th day of June 1972.

(SEAL)
Attest:

EDWARD M. FLETCHER, JR.
Attesting Officer

ROBERT GOTTSCHALK
Commissioner of Patents